United States Patent Office 3,847,855
Patented Nov. 12, 1974

3,847,855
WATER-BORNE LATICES
Thomas Larry Dawson, Charleston, W. Va., assignor to Union Carbide Corporation, New York, N.Y.
No Drawing. Filed Dec. 7, 1972, Ser. No. 312,898
Int. Cl. C08c 11/72; C08d 9/14
U.S. Cl. 260—23.7 A
12 Claims

ABSTRACT OF THE DISCLOSURE

Water-borne latices are produced by a process requiring the presence of four essential features, all of which must be carried out in seriatum or jointly. These features are the use of a monomer-soluble initiator, the use of a fugitive surfactant, the use of mixtures of hard monomers and soft monomers, and the thorough homogenization of the reactants prior to polymerization. The latices can be further treated to recover the resins in a form that is satisfactory for use in powder coating applications.

---

With the advent of synthetic polymers many new coating compositions were developed. In many instances these early coating compositions were based on solutions of the polymers in compatible organic solvents; they were applied to the surface to be coated and left a thin protective coating after evaporation of the solvent. Such coating compositions were not only wasteful in that the solvent added nothing to the finished coating, but they also resulted in atmospheric pollution. Advances led to the development of organosols, plastisols, emulsions, dispersions, 100 percent reactive solids coatings, all of which are used today to some extent. However, even these advances did not completely eliminate the problem of environmental atmospheric pollution by organic solvents to the extent water-based latices did upon their development. Many of these water-based latices, however, do not have the desired film properties, adhesion, physical appearance or resistivity to water that is found in the oil based coating compositions.

It has now been found that water-based latices having a combination of properties superior to those previously available can be produced by the process described in this application, with many of these latices being new compositions of matter. The water-based copolymer latices of this invention produce tough, hard coatings having good to excellent dry and wet adhesion to metallic surfaces, high gloss, and excellent resistance to water. The latices can in many instances be applied directly without the addition of filming aids or, if desired, by the addition of reduced levels of filming aids.

Since the water-based latices of this invention are produced directly, the process eliminates the many expensive procedural steps used in the past. For many years it has been the practice in the production of vinyl dispersion resins to dry the reaction product, grind the polymer to the necessary fine particle size, and then redisperse it in a suitable liquid vehicle in order to obtain a good coating. This is the procedure which is usually followed today for the production of plastisol and organosol dispersions and which has been eliminated by the instant invention.

The instant invention is characterized by the presence of four essential features, all of which must be carried out in seriatum or jointly. The four requirements are (1) the use of a monomer-soluble initiator in (2) the homogenization process for the production of dispersion resins, (3) the use of fugitive surfactants, preferably anionic, and (4) the use of mixtures of hard monomers and soft monomers in the polymerizable mixture.

The monomer-soluble initiator is initially dissolved at a temperature below the polymerization temperature of the monomers in one or more of the polymerizable monomers and then the resulting mixture is homogenized with water. Any of the known monomer-soluble initiators or mixtures thereof can be used, including the diacyl peroxides and peroxydicarbonates in which the organic radical contains up to about 20 carbon atoms or more. The preferred initiators are those in which the organic radical contains from about 10 to about 20 carbon atoms. Illustrative of suitable initiators one can mention dilauroyl peroxide, dicaprylyl peroxide, distearoyl peroxide, dipalmitoyl peroxide, dibenzoyl peroxide, 2-bromolauroyl lauroyl peroxide, dichlorobenzoyl peroxide, diisopropyl peroxydicarbonate, dicetyl peroxydicarbonate, didecyl peroxydicarbonate, didodecyl peroxydicarbonate, ditridecyl peroxydicarbonate, dioctadecyl peroxydicarbonate, dieicosyl peroxydicarbonate, di-t-butyl perbenzoate, 2,2'-azobis-2,4-dimethylvaleronitrile and other known monomer-soluble peroxides. The initiator is present at a concentration sufficient to catalyze the polymerization reaction and will vary from 0.01 to 5 percent by weight based on the weight of monomers present, preferably from 0.05 to 3 percent and most preferably from 0.1 to 2 percent. The particular concentration used in any instance will depend on the specific monomers being reacted and the specific initiator being used; this is well known to those skilled in the art. It is also known that traces of metal ions can be added as activators to improve the rate of initiation, if desired.

The homogenization of the aqueous mixtures of monomers, initiators and surfactants is carried out by any of the known homogenizing techniques. Many commercially available forms of homogenizing equipment are available such as colloid mills, centrifugal pumps, ultrasonic devices, vibratory stirrers, and other high shear devices. An important feature is good homogenization of the mixture and this is required to obtain the desired latices.

The surfactant is a fugitive surfactant. The term "fugitive surfactant" defines a surfactant which will decompose during the heating or curing step of the coating and result in volatilization of at least one of the decomposition fragments with the remaining fragment having lost its surfactant character and thus having no deleterious effect on the final coating. The preferred surfactants are the fugitive anionic surfactants; also suitable are mixtures thereof with nonionic surfactants. In some limited instances nonionic or fugitive cationic surfactants alone, or mixtures thereof, can be used. Among the preferred fugitive anionic surfactants are the ammonium salts of the fatty acids having from 10 to 26 carbon atoms, the ammonium salts of epoxidized fatty acids and of the dihydroxy derivatives of the epoxidized fatty acids; for example, ammonium caprate, ammonium laurate, ammonium myristate, ammonium palmitate, ammonium stearate, ammonium arachidate, ammonium behenate, ammonium lignocerate, ammonium cerotate, ammonium epoxy stearate and the hydrolyzates thereof, ammonium epoxy arachidate, ammonium 9,10-dihydroxystearate, amomnium salts of styrene-maleic acid copolymers, and the like. The surfactant can be present at a concentration of from about 0.1 to about 5 percent by weight based on the total monomers present. It is preferably above about 0.2 percent since below this value there is a risk of breaking the emulsion and resultant particle agglomeration. The particular concentration most desirable in any instance will depend upon the monomers and the structure of the surfactant itself as well as the concentration of the solids in the latex. It has been observed that when the total solid in the latex is of the order of 40 percent or greater, that a concentration of from 0.5 to 2 percent of surfactant is preferred.

The water-based coating compositions produced by the process of this invention are obtained by the copolymerization of at least two monomers, at least one of which is a hard monomer and at least one of which is a soft monomer. The copolymers can, of course, be further modified by the inclusion of other polymerizable modifiers that can serve at plasticizers, crosslinkers, chain-transfer agents, or to modify the properties of the polymers, as will be shown hereinafter.

In this specification, the term hard monomer defines a monomer whose homopolymer, at the same average degree of polymerization as the copolymer, would have a glass transition temperature greater than 40° C. Illustrative of homopolymers having glass transition temperatures above 40° C. at number average molecular weights of 10,000 or more are poly(glycidyl methacrylate), poly(vinyl chloride), poly(ethyl methacrylate), poly(acrylic acid), polystyrene, poly(methyl methacrylate), poly(alphamethyl styrene), poly(hydroxymethyl styrene), polyacrylonitrile, polymethacrylonitrile, as well as the homopolymers of, for example, acenaphthalene, 1,2-difluoroethylene, hexafluoropropylene, 1,2-dichloroethylene, isobornyl acrylate, 2-chloroethyl methacrylate, cyclohexyl methacrylate, isobornyl methacrylate, isopropyl methacrylate, isobutyl methacrylate, phenyl methacrylate, methyl chloroacrylate, isobutyl chloroacrylate, 2-butyl chloroacrylate, cyclohexyl chloroacrylate, ethyl chloroacrylate, isopropyl chloroacrylate, propyl chloroacrylate, 4-carboxyphenylmethacrylamide, diphenylvinylphosphine oxide, 4-bromostyrene, 5-t-butyl-2-methylstyrene, 4-t-butyl-styrene, 4-chloro-3-fluorostyrene, 4-chloro-2-methylstyrene, 2,4-dichlorostyrene, 2,5-dimethylstyrene, 3,4-dimethylstyrene, 4-fluorostyrene, 2-hydroxymethylstyrene, 4-hydroxymethylstyrene, 4-iodostyrene, 4-propoxystyrene. The monomers used to produce the homopolymers listed above are illustrative of hard monomers. This representation is not all-inclusive and those skilled in the polymer art are fully cognizant of other suitable hard monomers and experience no difficulty in determining the glass transition temperatures and thus establish the identity of the hard monomer. Similarly, those skilled in the art are cognizant that the molecular weight has an influence on the glass transition temperature. Thus, it is known that the glass transition temperature of vinyl chloride homopolymer varies with molecular weight, as shown below:

| Number Average Molecular Weight: | Glass Transition Temperature, ° C. |
| --- | --- |
| 1,100 | 31 |
| 2,000 | 44 |
| 5,300 | 64 |
| 15,000 | 72 |
| 25,000 | 74 |
| 34,000 | 76 |
| 45,000 | 77 |

In this invention a hard monomer is one whose homopolymer at the average degree of polymerization of the copolymer would have a glass transition temperature above 40° C.

The term soft monomer defines a comonomer that will copolymerize with the hard monomer and whose homopolymer, at the same average degree of polymerization as the copolymer, would have a glass transition temperature below 40° C. The presence of the soft monomer in the copolymer serves to soften the copolymer particle and aid the filming properties during the cure or bake of the coated article.

Illustrative of homopolymers having glass transition temperatures below 40° C. at number average molecular weights of 10,000 or more one can mention the homopolymers of ethylene, propylene, butylene, 1-pentene, 1-hexene, 1-heptene, neohexene, decene, vinylidene chloride, vinyl acetate, vinyl propionate, vinyl formate, vinyl stearate, methyl acrylate, ethyl acrylate, propyl acrylate, butyl acrylate, stearyl acrylate, butyl methacrylate, hexyl methacrylate, decyl methacrylate, dodecyl methacrylate, vinyl versatate (the vinyl ester of a mixture of branched chain saturated tertiary carboxylic acids containing 10 carbon atoms in the molecules), vinylidene fluoride, 1,2-butadiene, 1,3-butadiene, 2-chloro-1,3-butadiene, 2-decyl-1,3-butadiene, 2,3-dimethyl-1,3-butadiene, 2-methyl-1,3-butadiene, cyclohexyl acrylate, heptyl acrylate, 2-(2-cyanoethylthio)ethyl acrylate, 1,1-dihydroperfluorobutyl acrylate, 3-ethoxypropyl acrylate, 2-ethylhexyl acrylate, 2-ethylthioethyl acrylate, hexyl acrylate, isobutyl acrylate, octyl acrylate, nonyl acrylate, 2-ethylhexyl methacrylate, hexadecyl methacrylate, 2-methoxyethyl methacrylate, N,N-diethylaminoethyl methacrylate, 4-decylstyrene, 4-dodecylstyrene, 4-hexadecylstyrene, 4-hexylstyrene, 4-butoxymethylstyrene, 4-nonylstyrene. This representation is not all-inclusive and those skilled in the art are fully cognizant of other suitable soft monomers and their glass transition temperatures.

Among the preferred soft monomers one can mention ethylene, propylene, and vinylidene chloride. The advantages of using ethylene and propylene with comonomers having higher boiling points than they do are that uniform copolymers can be prepared by maintaining a constant reactor pressure throughout the polymerization reaction and no residue thereof remains in the latex after the latex dispersion has been stripped; of the two, ethylene is preferred since propylene has a tendency to retard the rate of copolymerization with certain comonomers, such as vinyl chloride. Vinylidene cholride as the soft comonomer reacted with vinyl chloride as the hard comonomer will produce uniform copolymers by the process of this invention under generally constant comonomer ratios that have excellent filming properties without the need of a filming air, coatings that have good physical properties, and in addition the polymerization reaction can be carried out at low pressures. Suitable vinyl chloride copolymers have been produced having up to about 35 percent vinylidene chloride therein.

There can also be present small amounts of other polymerizable reactive monomers. These monomers can contain polar or reactive groups that serve to improve the adhesion properties of the coating or to provide crosslinking sites in the polymer backbone, such as pendant epoxy, carboxyl, amino or amide groups and to improve the mechanical stability of the latexes. As examples thereof one can mention glycidyl methacrylate, acrylic acid, methacrylic acid, itaconic acid, maleic acid, fumaric acid, crotonic acid, aconitic acid, citrionic acid, the mono-n-butyl ester of 5-norbornene-2,3-diarboxylic acid, the mono esters of maleic or fumaric acids, N,N-dimethylaminoethyl acrylate or methacrylate, N,N-diphenylaminoethyl acrylate or methacrylate, glycidyl acrylate, butyl glycidyl fumarate, and the like. The concentration of such reactive monomer in the copolymer will vary depending upon the particular system involved and the properties desired. Thus, it has been observed that the adhesion of the copolymers of vinyl chloride with ethylene or with vinyl acetate can be improved by the presence of from 0.2 to 10 weight percent of a reactive monomer, preferably from 1 to 5 percent thereof, in the copolymer. It has also been observed that good thermoset reactivity is achieved with reactive monomer contents from 0.5 to 30 percent by weight, preferably from 1 to 15 percent. As indicated, however, the particular amounts will vary on the system involved and will depend upon the hard and soft monomers employed and their concentrations, the specific reactive monomer selected, the uniformity of the distribution of the reactive monomer along the polymer chain, the molecular weight of the copolymer produced, the reactivity of the reactive gorup of the reactive monomer, as well as the ultimate use of the product. The preferred amount can be readily determined by one skilled in the art by a simple series of polymerization reactions followed by routine evaluation of the copolymers produced.

The concentration of soft monomer in the copolymer can vary from about 1 or less to about 40 percent or more, preferably from about 2 to about 30 percent of the total monomers present. As is apparent, the optimum concentration of a particular soft monomer in a copolymer to achieve the optimum desired properties is dependent upon the specific hard and soft monomers involved, the presence or absence of other modifying monomers or reactants, the uniformity of distribution of the different comer units along the polymer chains, the structures of the mer units in the chain (i.e., the glass transition temperatures of the homopolymers of the monomers employed), the ultimate properties desired in the final product, all of which are taken into consideration by the skilled individual. As is apparent, one can use mixtures of hard monomers and/or mixtures of soft monomers, if desired.

Thus, it has been found that water-based coating compositions of copolymers of vinyl chloride (hard monomer) and ethylene (soft monomer) having excellent coating properties an be produced by the process of this invention that have ethylene mer contents of from 2 to 15 weight percent, preferably 4 to 8 weight percent. Copolymers in these aqueous latex compositions produced at 45 to 50° C. at ethylene pressure of about 550 p.s.i.g. contain from about 5 to about 6 weight percent ethylene uniformly copolymerized therein along the polymer chains. These vinyl chloride-ethylene copolymer aqueous latices having up to 45 percent total solids can be coated and cured to smooth, integral, adhesive films on chrome-chrome oxide plated steel by heating at 385° F. four four minutes with 25 parts per hundred parts of resin of the mono ethyl ether of diethylene glycol added as filming aid to the coating compositions that are at least equally satisfactory. Similar results are achieved with an aqueous latex of a vinyl chloride-ethylene copolymer having about 4 percent ethylene, produced by the process of this invention, to which has been added 50 parts of the filming aid per hundred parts of resin. In contrast, similarly prepared vinyl chloride homopolymer latices do not film with up to 50 parts of the filming aid at temperatures up to 392° F.

Typically the polymerization is carried out at a temperature of from about 35° C. to about 80° C. or higher; the preferred temperature is from about 40° C. to 60° C. with the temperature most preferably being from about 44° C. to about 50° C. The pressure is not critical and is essentially dependent on the nature of the monomers being employed, gaseous monomers requiring superatmospheric pressures.

The copolymers produced have inherent viscosities of from 0.1 to 2.5. The viscosity is determined on a dried sample of the copolymer that has been dissolved in a suitable solvent at a concentration of 0.2 gram of polymer in 100 ml. of solvent. The determination is made at 30° C. with a Ubbelhode viscometer; the preferred solvent for vinyl chloride copolymers is cyclohexanone.

One can also have present in the polymerizable mixture any of the useful chain transfer agents so as to decrease the inherent viscosity of the resultant copolymer. Useful therefor, among other, are carbon tetrabromide, trichloroethylene, cumene, ethyl benzene, benzyl chloride, butanol, toluene, the alkyl and aryl mercaptans, or any of the other compounds known to those skilled in the art. Similarly one can add any of the conventional additives known to be suitable for increasing the inherent viscosity by chain-branching or a chain-extension mechanism. Suitable additives include diallyl isophthalate, triallyl cyanurate, divinyl benzene, pentaerythritol triacrylate, neopentylglycol diacrylate, ethylene glycol dimethacrylate, or the like. Any of these additives are used at the concentrations known to impart the desired characteristics.

Similarly, one can incorporate into the latex a suitable plasticizer, if desired. These can be added to the composition before homogenization and polymerization or added to the latex after the polymerization. Suitable therefor are dioctyl phthalate, polycaprolactone, ethylene/vinyl acetate copolymers, dioctyl sebacate, epoxy plasticizers, and the like. The addition of stabilizers, antioxidants, flow control additives, pigments and colorants, and other additives normally added to latex compositions is also within the scope of this invention. These and the concentrations to be used are all well known to one skilled in the art and do not require further elaboration herein.

The water-based latex coating compositions produced by the process of this invention can have a solids content of from about 10 to 75 percent by weight. For practical reasons it is preferred to synthesize latices having a solids content of about 35 to 45 percent by weight, or more.

The aqueous latices can be dried and the copolymer recovered in powder form and used in powder coating applications. The means by which this is accomplished are well established in the art.

In a typical reaction a mixture of the polymerizable monomers, monomer-soluble initiator, fugitive surfactant, and other additives desired to be present is homogenized in water. The polymerizable monomers are a mixture of at least one hard monomer and at least one soft monomer. The homogenized mixture is then polymerized to produce the water-based latex which is recovered and used per se as a coating composition, or dried to recover the copolymer as a powder for powder coatings application by known means, spray drying and grinding.

This invention permits the production of water-borne coating compositions capable of yielding coatings that are resistant to water and many other chemicals, and possess excellent adhesion and toughness.

The use of monomer-soluble initiators has the great advantage of not producing water sensitive residues should they decompose in the latex or themselves being water sensitive. Water sensitivity contributes to poorer water resistance of the coating and decreased adhesion on exposure to moisture. Mechanical homogenization gives emulsification without the need to use strong non-fugitive surfactants which contribute to water sensitivity of the final coating. The fugitive surfactants permit production and handling of a latex without leaving harmful residues in the final coating that can affect water sensitivity and other physical properties. The mixture of hard and soft monomers forms copolymers having a desired balance of chemical and physical properties (such as hardness, water resistance, chemical resistance, thermal stability) found in the homopolymers of the hard monomers, together with the physical and chemical properties (such as flowability and fusion during the baking or curing step) found in the homopolymers of the soft monomer; all in one copolymer molecule.

The following examples serve to illustrate the process of this invention.

EXAMPLE 1

An aqueous ammonium laurate solution was prepared by dissolving 17.03 grams of lauric acid in 2,471 grams of water and 300 ml. of 0.5 N ammonium hydroxide and then adjusting the pH to 9.1 with ammonium hydroxide. A solution of 4.66 grams of dilauroyl peroxide in 1,864 grams of vinyl chloride was added and the entire mix was stirred, at 50 p.s.i.g. and at 20° C. for 15 minutes, at 400 r.p.m. The premix was then passed through a two-stage Manton-Gaulin homogenizer with a pressure of 1,350 p.s.i.g. at each stage. The homogenized mixture was passed into a pressure reactor with the pressure maintained at 60 to 110 p.s.i.g. with ethylene. Ethylene was further charged to the reactor for 15 minutes to maintain a pressure of 480 p.s.i.g. at a reactor temperature of 25° C., while stirring at 200 r.p.m. The mixture was heated to 47° C. and stirred slowly at that tempertaure and at a pressure of about 560 p.s.i.g. for 28.5 hours. The reactor was vented and unreacted monomers were stripped while permitting the latex to cool to room temperature. The recovered copolymer latex had a total solids content of 26.3 percent. Only 2.3 percent of the total polymer formed was lost as scrap; scrap is defined as coagulated polymer particles and polymer coated on to the equipment surfaces. A tray dried sample of the copolymer latex had an inherent viscosity of 0.97, determined at 30° C. using a 0.2 percent solution of the copolymer in cyclohexanone.

After adding 25 phr. of the monoethyl ether of diethylene glycol, as filming aid, to the vinyl chloride/ethylene copolymer latex, a film was cast on chrome-chrome oxide plated steel panels and cured for four minutes at 200° C. The cured coating a 4H pencil hardness. One of the coated steel panels was submerged in water for 45 minutes at 74.6° C. and two minutes after removal from the water it exhibited excellent adhesion (no failure, 100 percent remaining) and excellent blush resistance; wet adhesion to budium primed steel (a steel panel primecoated with a butadiene-based polymer) and an aluminum panel was poor. Blush resistance was determined visually; adhesion was determined by crosshatching the coating, applying a piece of 3M No. 610 adhesive tape and pulling. The coating also showed no failure in the wedge-bend test; this involves bending the coated panel to 30° offset, completely folding the panel at the bend, dipping the folded bent surface in saturated copper sulfate solution for three minutes and visually inspecting for breaks in the film.

EXAMPLE 2

A homogenized mixture of 1,864 grams of vinyl chloride and 17 grams of glycidyl methacrylate was prepared in the same manner as described in Example 1. It was then polymerized at 44° C. at a pressure of 500 to 550 p.s.i.g. for 26 hours. The recovered vinyl chloride/ethylene/glycidyl methacrylate latex had a total solids content of 23.4 percent; only 2.9 percent of the total polymer produced was lost as scrap. The copolymer had an approximate ethylene content between five and six percent and a glycidyl methacrylate content of 1.7 percent.

After adding 25 phr. of the monoethyl ether of diethylene glycol the latex was coated on chrome-chrome oxide plated steel, budium primed steel and aluminum panels and cured as described in Example 1. All of the coated panels showed excellent adhesion, excellent hardness and excellent gloss. This latex coating showed improved thermal stability as observed visually when compared to the product of Example 1, as well as an enhanced ability to wet metal surfaces as evidenced by the complete covering to the edges of dipped panels with latexes having only a 25 percent total solids content whereas the latex of Example 1 required a total solids content of about 40 percent to obtain edge covering.

EXAMPLE 3

An aqueous ammonium laurate solution was prepared as described in Example 1. Also prepared was a mixture of 1,864 grams of vinyl chloride, 131 grams of vinylidene chloride and 13.98 grams of dilauroyl peroxide which was added to the aqueous solution and homogenized as described in Example 1. The homogenized mixture was polymerized in a reactor at 50° C. at a pressure of 93.5 p.s.i.g. The pressure was maintained by the intermittent addition of an additional 165 grams of vinylidene chloride to the polymerization reactor over the 26 hours and 10 minutes reaction period. The recovered vinyl chloride/vinylidene chloride latex had a total solids content of 30.6 percent.

A tray dried sample of a portion of the latex indicated that the resin had a vinylidene chloride content of about 20 percent and an inherent viscosity of 0.56 at 30° C. using a 0.2 percent solution in cyclohexanone.

The coating properties of this latex were evaluated by the tests described in Example 1, with the exception that the monoethyl ether of diethylene glycol was not added, i.e., no filming aid was added. The excellent coating properties of this latex are summarized in the following table:

| Substrate | Curing conditions | | Coating properties (.1–.2 mil film) | | | | |
|---|---|---|---|---|---|---|---|
| | Time, min. | Temp., °C. | Pencil hardness | Blush [1] | Wet adhesion [2] | Wedge 20° bend [1] | Gardner gloss |
| Steel | 15 | 150 | 3H | 10 | 100 | 0 | 31 |
| Do | 15 | 175 | 3H | 10 | 100 | 8 | 16 |
| Do | 4 | 200 | 3H | 10 | 100 | 10 | 83 |
| Aluminum | 4 | 200 | 2H | 7 | 100 | (3) | >100 |

[1] Ranked on scale of 0–10; 10=no change, 0=complete failure.
[2] Percent of film remaining on the substrate after subjecting the film to the crosshatch adhesion test described in Example 1.
[3] Test not applicable here; the aluminum breaks and copper does not deposit on the aluminum.

EXAMPLE 4

A vinyl chloride/ethylene latex was produced by the same manner described in Example 1 differing only in that the polymerization was carried out at 44° C. and 550 p.s.i.g. for 25 hours and 50 minutes. The recovered latex had a total solids content of 23.4 percent with the resin having an inherent viscosity of 1.07. The latex was spray dried and the powder was then used to coat chrome-chrome oxide plated steel panels using a Ransburg Electrostatic Spray Gun at 90,000 volts (negative) and 40 lb. air pressure. Uniform powder coatings were achieved and baked for 5, 10 and 15 minutes in a 230° C. air oven; all coatings showed adhesion with the best adhesion exhibited by the coating baked 15 minutes.

EXAMPLE 5

A vinyl chloride/vinylidene chloride copolymer latex was produced by the same manner described in Example 3 differing only in that 20.97 grams of dilauroyl peroxide were employed, the homogenization pressures were 2,000 p.s.i.g. at each stage, and the polymerization pressure was maintained by the intermittent addition of an additional 170 grams of vinylidene chloride to the polymerization reactor over the 27 hours and 20 minutes reaction period. The recovered vinyl chloride/vinylidene chloride copolymer latex had a total solids content of 28.56 percent and a pH of 7.35.

Six ml. of concentrated ammonium hydroxide was added to the latex to raise the pH to 9.0. The latex was spray dried in a small spray dryer at an inlet air temperature of 115° C. and a cone temperature of 40° C. The total solids content of the spray dried resin powder was 96.96 percent. The resin had an inherent viscosity of 0.49 at 30° C. using a 0.2 percent solution in cyclohexanone.

The powder was ground in an air grinder and then electrostatically deposited as described in Example 4. Baking for 4 minutes at 205° C. formed a reasonably smooth and adherent 0.2 to 0.5 mil film on chrome-chrome oxide plated steel.

What is claimed is:

1. In a process for the production of water-based latices of copolymers of hard monomers and soft monomers useful as coating compositions, the steps of homogenizing an aqueous mixture consisting essentially of (i) said monomers, (ii) a monomer-soluble initiator and (iii) an anionic ammonium salt of a fatty acid of from 10 to 26 carbon atoms as the fugitive type surfactant at a temperature below the polymerization temperature of said mixture, heating and stirring said homogenized aqueous mixture at a polymerization temperature sufficient to cause said monomers to undergo polymerization, and recovering the copolymer latex; said hard monomer being a monomer whose homopolymer has a glass transition temperature greater than 40° C. and said soft monomer being a monomer whose homopolymer has a glass transition temperature less than 40° C.

2. A process as claimed in claim 1 wherein said hard monomer is vinyl chloride.

3. A process as claimed in claim 1 wherein said soft monomer is ethylene.

4. A process as claimed in claim 1 wherein said soft monomer is vinylidene chloride.

5. A process as claimed in claim 1 wherein a mixture of hard monomers is used.

6. A process as claimed in claim 1 wherein a mixture of soft monomers is used.

7. A process as claimed in claim 5 wherein said mixture is a mixture of vinyl chloride and gylcidyl methacrylate.

8. A process as claimed in claim 2 wherein the soft monomer is vinylidene chloride.

9. A process as claimed in claim 2 wherein the soft monomer is ethylene.

10. A process as claimed in claim 1 wherein the monomer-soluble initiator is dilauroyl peroxide.

11. A process as claimed in claim 1 wherein the copolymer latex is dried and the copolymer recovered as a dry resin.

12. A water-based coating composition of copolymers of hard monomers and soft monomers said composition produced by the process claimed in claim 1.

References Cited

UNITED STATES PATENTS

| | | | |
|---|---|---|---|
| 3,399,157 | 8/1968 | Deex et al. | 260—23 XA |
| 3,551,399 | 12/1970 | Yonczy | 260—85.5 |
| 3,575,904 | 4/1971 | Clarke et al. | 260—23 XA |

DONALD E. CZAJA, Primary Examiner

W. E. PARKER, Assistant Examiner

U.S. Cl. X.R.

117—138.8 R, 138.8 F, 138.8 UA; 260—29.6 PM, 85.5 MM, 92.8 W